April 10, 1956
A. H. EMERY
2,741,032
DIAL INDICATOR
Filed Nov. 10, 1953
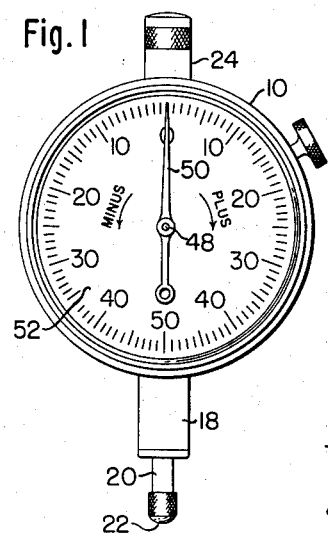
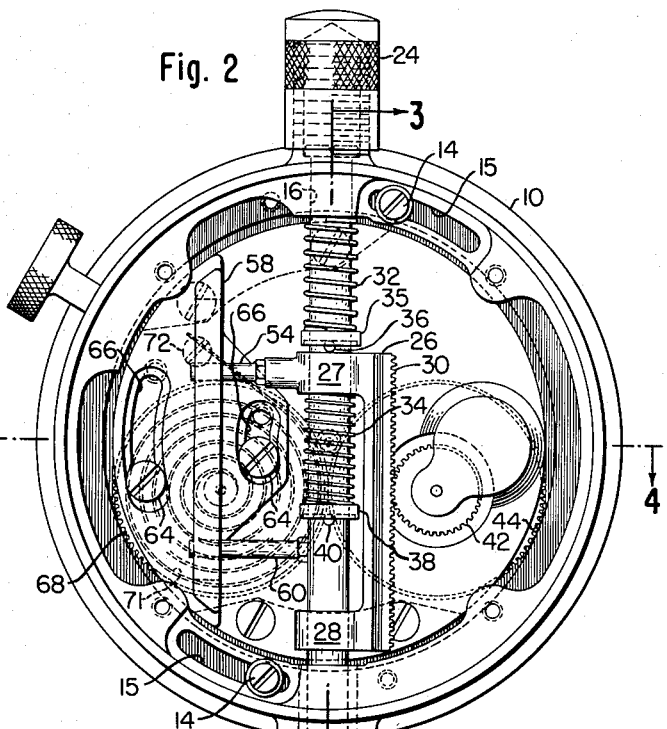
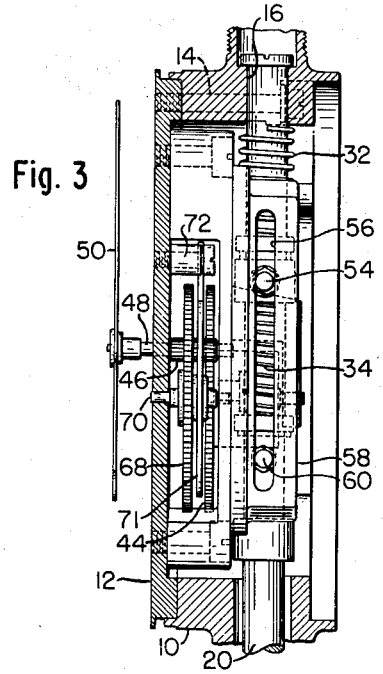
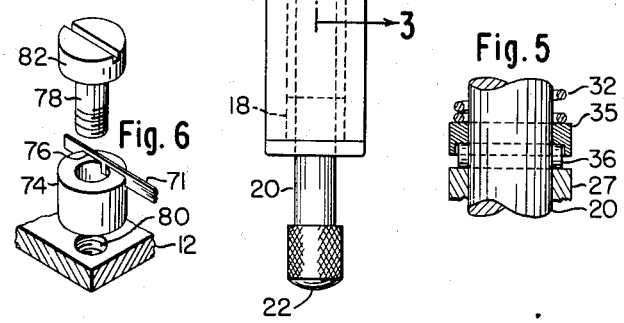
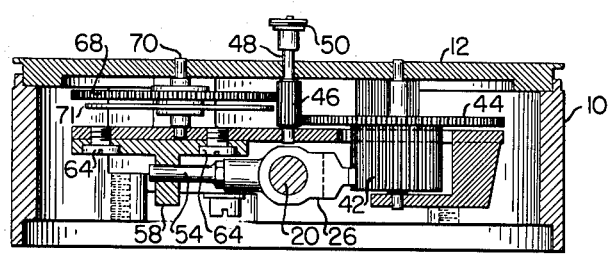
INVENTOR.
ALFRED H. EMERY
BY
Kenway, Jenney, Witter & Hildreth
ATTORNEYS

United States Patent Office 2,741,032
Patented Apr. 10, 1956

2,741,032

DIAL INDICATOR

Alfred H. Emery, Athol, Mass., assignor to The L. S. Starrett Company, Athol, Mass., a corporation of Massachusetts Application November 10, 1953, Serial No. 391,321

7 Claims. (Cl. 33—172)

This invention relates to dial indicators of the rack and pinion type and the primary object of the invention resides in the production of an improved and simplified dial indicator of this nature which will eliminate gear assemblies and other elements and substantially reduce the number of parts heretofore required, simplify the assembly and generally strengthen the construction and render it more compact and shockproof.

My improved indicator employs a relatively simple and economical rack and gear train and is so adjustable that the same unit can be made to serve various models merely by substituting rack pinions varying in size and adjusting the rack and other cooperating parts accordingly. The production of an assembly embodying such improved features comprises a further object of the invention.

The toothed rack in my assembly is loosely mounted on a contact plunger between compression springs one of which supports the rack shockproof on the plunger. Certain ends of the springs are supported by cross pins extending loosely through the plunger and a further novel feature of the invention resides in the employment of loose collars on the plunger cooperating with the springs and pins to maintain the pins in place.

The indicator includes a hair spring assembly geared directly to the indicator shaft and a further feature of the invention resides in a novel anchoring means for the free end of this spring. Heretofore this end of the spring has been anchored with difficulty beneath the head of a clamping screw which tends to twist and offset the spring and often render it useless when the screw is tightened. My invention contemplates a slotted collar on the screw for receiving the spring and rendering its arcuate clamping a simple and sure procedure.

These and other features of the invention will be best understood and appreciated from the following description of a preferred embodiment thereof selected for purposes of illustration and shown in the accompanying drawing in which—

Fig. 1 is a face view of my dial indicator,

Fig. 2 is an enlarged rear view with the closure plate removed,

Fig. 3 is a vertical section taken on line 3—3 of Fig. 2,

Fig. 4 is a horizontal section taken on line 4—4 of Fig. 2,

Fig. 5 is an enlarged fragmentary view of a detail shown in Fig. 2,

Fig. 6 is an enlarged fragmentary view of the spring anchoring means, and

Fig. 7 is a rear view of the assembly similar to Fig. 2 but illustrating a modified adjustment.

In the drawing, 10 indicates an annular casing or ring comprising the body of the gauge. A front plate 12 is secured to the casing by screws 14 extending through arcuate slots 15 in the casing and threading into the plate, thereby rendering the plate and casing relatively adjustable about the center of the casing. Two diametrically opposed bearings 16 and 18 are formed on the casing and a plunger 20 is slidably mounted in these bearings and carries a contact element 22 on its outer end. The other end of the plunger and its bearing 16 are closed by a threaded cap 24.

A U-shaped rack member 26 has two spaced legs 27 and 28 loosely mounted on the plunger within the casing and outwardly disposed rack teeth 30 parallel with the plunger. Two compression springs 32 and 34 are mounted on the plunger at opposite sides of the leg 27. The spring 32 bears against the casing at its outer end and against a loose collar 35 at its inner end and the spring 34 is disposed between the two legs 27 and 28. The collar rests on and is recessed to receive a pin 36 extending loosely through the plunger and engaging one side of the leg 27. The inner end of the spring 34 is in pressure contact with the other side of the leg 27 and its outer end rests on a loose collar 38. The collar 38 rests on and is recessed to receive a pin 40 extending loosely through the plunger. The recessing of the collars 35 and 38 to receive the pins 36 and 40 serves two functions, namely, to retain the pins in the plunger and to equalize the distance each pin projects outwardly thereof at both ends, thereby maintaining the collars level and equalizing the pressure of the springs on the top faces of the collars. The spring 32 is relatively weaker than the spring 34 for reasons hereinafter described.

The rack 30 is in mesh with a pinion 42 fixed to a larger pinion 44 and mounted to rotate on the front plate 12. The pinion 44 is in mesh with a small pinion 46 on the centrally disposed dial shaft 48 carrying a hand 50 on its outer end. The hand is adapted to rotate about the dial 52 and cooperate with the index marks thereabout. The rack member 26 is held against rotation on the plunger by an arm 54 carried by and extending outwardly from the member and into a guide slot 56 in a bracket 58, the slot being parallel with the plunger. The plunger also is held against rotation by a like arm 60 carried by the plunger and engaging within the guide slot. The employment of one and the same guide slot for both the plunger and rack member not only simplifies the construction but also assures continued and accurate alignment of these parts during their movements longitudinally of the plunger. The positioning of the guide slot a substantial distance laterally of the plunger and member together with the relatively long arms required also renders the guiding alignment more accurate as will be readily apparent.

It will be apparent that the movement of the hand 50 relative to the plunger 20 is considerably amplified through the gear train and that this relation can be varied substantially between wide limits by substituting relatively smaller and larger pinions for the pinion 42. In Fig. 7, for example, I have illustrated a smaller pinion 62 substituted for the pinion 42. Thus changing the rack engaging pinion requires adjustment of the rack from the position illustrated in Fig. 2, and in broken lines in Fig. 7, to the position shown in full lines in Fig. 7. The screws 14 and slots 15 permit this adjustment. The guide 56 must also be adjusted to a position parallel with the plunger and the following described structure is provided for this purpose.

The bracket 58 is secured to the face plate 12 by clamping screws 64 extending through slots 66 in the bracket and threaded into the face plate. The slots are disposed arcuately about the center of the casing and permit adjustment of the bracket to the required parallelism, as will be understood.

The movement of the gear train and index hand are under the gentle control of a hair spring assembly and in accordance with my invention I mount this assembly in the casing independently of the rack assembly as illustrated in Fig. 4 and connect it directly to the index shaft 48. Such arrangement of the assembly not only simplifies the construction but furthermore applies the hair spring control directly to the index shaft. This assembly includes a relatively large pinion 68 in mesh with the pinion 46 and mounted to rotate with a shaft 70 on the front plate 12. A hair spring 71 is connected at its inner end to the shaft and is disposed spirally thereabout. The outer end of the spring is anchored at 72 and means for anchoring this end of the spring is illustrated in Fig. 6. A collar 74 is slotted at 76 to a depth receiving the major width of the spring. A clamping screw 78 is adapted to extend through the collar and thread into the face plate 12 at 80. The head 82 of the screw engages the outer margin of the spring and clamps it and the collar securely to the face plate. This construction substantially simplifies the assembling operation and makes the anchoring step a simple, quick and sure procedure.

Having thus disclosed my invention what I claim as new and desire to secure by Letters Patent is:

1. A dial indicator comprising an annular casing, diametrically opposed bearings in the casing, a plunger mounted to slide longitudinally in the bearings, a rack loosely mounted on the plunger between the bearings and having a guide bar extending laterally therefrom, a front plate, means mounting the front plate on the casing for relative adjustment about the center of the casing, a bracket disposed laterally of the plunger within the casing and having a guide track facing the plunger and receiving and guiding the guide bar, and means mounting the bracket on the indicator for adjustment about the center of the casing.

2. A dial indicator comprising an annular casing, diametrically opposed bearings in the casing, a plunger mounted to slide longitudinally in the bearings, a rack in the casing having a laterally extending portion disposed loosely on and about the plunger, a compression spring on the plunger at one side of said portion, a stop fixed to the plunger between and providing an abutment for engaging at opposite sides thereof said portion and one end of the spring, a second compression spring on the plunger at the other side of said portion and having one end thereof disposed to exert expanding pressure on said portion toward the stop, and a stop for the second spring at its other end and comprising a collar loose on the plunger and a cross pin extending through the plunger and having outwardly projecting ends engaged by the collar, the pin engaging face of the collar being recessed to receive and overlap the ends of the pin.

3. In combination, a frame, a plunger, means mounting the plunger for axial movement in the frame, a compression spring on and surrounding the plunger, and a stop for the spring at one end thereof and comprising a collar loose on the plunger and a cross pin extending through the plunger and having outwardly projecting ends engaged by the collar, the pin engaging face of the collar being recessed to receive and overlap the ends of the pin.

4. A dial indicator comprising an annular casing, diametrically opposed bearings in the casing, a U-shaped rack member in the casing having rack teeth disposed longitudinally of the member between the two U-legs thereof, a plunger mounted to slide longitudinally in the bearings and extending loosely through said legs parallel with the rack, two compression springs mounted on the plunger at opposite sides of one of the legs in position holding said one leg between their inner ends, the outer end of one spring being supported against the casing and the other spring being disposed between the two legs of the rack member, means including an abutment fixed to the plunger and supporting the outer end of the other spring, a guide parallel with the plunger, an arm carried by the rack member and in guiding engagement with the guide, and a second arm carried by the plunger and in guiding engagement with the guide.

5. The dial indicator defined in claim 4 plus an abutment fixed to the plunger and disposed between and in contact with said one leg and the inner end of said one spring.

6. The dial indicator defined in claim 4 in which said abutment embodies a cross pin extending transversely through the plunger and a collar loose on the plunger and having a recess receiving and overlapping the ends of the pin.

7. A dial indicator comprising an annular casing, diametrically opposed bearings in the casing, a plunger mounted to slide longitudinally in the bearings, a member loosely mounted on the plunger within the casing and having rack teeth therealong parallel with the plunger, means providing a track guide within the casing parallel with and spaced laterally away from the plunger, an arm rigidly carried by the plunger and extending laterally therefrom into the track guide, and an arm rigidly carried by the said member and extending laterally therefrom into the track guide, said arms being movable with the plunger and member along and within the track guide and preventing rotation of the plunger and member about the longitudinal axis of the plunger.

References Cited in the file of this patent

UNITED STATES PATENTS

| | | |
|---|---|---|
| 564,235 | Tidd | July 21, 1896 |
| 789,851 | Gibson | May 16, 1905 |
| 1,617,485 | Hughes | Feb. 15, 1927 |
| 2,165,017 | Sisson | July 4, 1939 |
| 2,627,401 | Harada | Feb. 3, 1953 |
| 2,645,857 | Andersson | July 21, 1953 |
| 2,663,945 | Emery | Dec. 29, 1953 |